US009298684B2

(12) United States Patent
Abel et al.

(10) Patent No.: US 9,298,684 B2
(45) Date of Patent: Mar. 29, 2016

(54) IMPLEMENTING CUSTOM USER INTERFACE FORMS IN A PERSONAL INFORMATION MANAGER

(75) Inventors: Todd J. Abel, Redmond, WA (US); Dayam Joel Zambrano, Bothell, WA (US); John William Strick, Seattle, WA (US); Emre Bogazliyanlioglu, Redmond, WA (US); Mohammad A. Rashid, Redmond, WA (US); Kevin Lane Brown, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1221 days.

(21) Appl. No.: 12/141,902

(22) Filed: Jun. 18, 2008

(65) Prior Publication Data

US 2009/0319921 A1 Dec. 24, 2009

(51) Int. Cl.

| | |
|---|---|
| ***G06F 3/00*** | (2006.01) |
| ***G06F 17/24*** | (2006.01) |
| ***G06F 9/44*** | (2006.01) |
| ***G06F 17/22*** | (2006.01) |

(52) U.S. Cl.

CPC ................ *G06F 17/243* (2013.01); *G06F 8/38* (2013.01); *G06F 17/2247* (2013.01)

(58) Field of Classification Search

CPC ......... H04L 67/12; H04L 69/26; H04L 63/08; H04L 67/16; H04L 12/282; H04L 2012/285; H04L 2209/603; H04L 2463/101; H04L 2463/102; H04L 63/0428; H04L 63/061; H04L 63/0823; H04L 63/20

USPC .................................................. 715/760, 762

See application file for complete search history.

(56) References Cited

U.S. PATENT DOCUMENTS

| | | | | |
|---|---|---|---|---|
| 6,289,513 | B1 | 9/2001 | Bentwich | |
| 7,010,616 | B2 | 3/2006 | Carlson et al. | |
| 7,546,313 | B1 * | 6/2009 | Sonderegger | |
| 7,779,085 | B2 * | 8/2010 | Neil et al. | 709/217 |
| 2002/0144281 | A1 * | 10/2002 | Taguchi et al. | 725/109 |
| 2003/0184585 | A1 * | 10/2003 | Lin et al. | 345/763 |
| 2005/0198085 | A1 | 9/2005 | Blakey et al. | |
| 2006/0004836 | A1 | 1/2006 | Dhingra | |

(Continued)

FOREIGN PATENT DOCUMENTS

GB WO2005073847 A2 8/2005

OTHER PUBLICATIONS

Joey Lott, Flash 8 Cook Book, (Apr. 12, 2006).*

"Customizing Outlook Forms", 2004-2007, Add-in Express Ltd, pp. 3.

"Walkthrough: Creating an Outlook Form Region", 2008, Microsoft Corporation, pp. 9.

(Continued)

*Primary Examiner* — Amy Ng
*Assistant Examiner* — Di Xiao
(74) *Attorney, Agent, or Firm* — Steve Crocker; Danielle Johnston-Holmes; Micky Minhas

(57) ABSTRACT

Technologies are described herein for incorporating custom user interface (UI) forms into a personal information manager (PIM) application using a declarative form markup specification. A native PIM form specification is generated from a file containing the declarative form markup describing the custom UI form. When a request to display the custom UI form is received, a PIM native form renderer invokes a forms runtime engine that loads the original declarative form markup to process data bindings and event subscriptions contained therein. The custom UI form is then rendered to the display by the PIM native form renderer in conjunction with the forms runtime engine.

16 Claims, 7 Drawing Sheets

(56) References Cited

U.S. PATENT DOCUMENTS

| | | | | |
|---|---|---|---|---|
| 2006/0050142 | A1* | 3/2006 | Scott et al. | 348/14.05 |
| 2006/0080468 | A1 | 4/2006 | Vadlamani et al. | |
| 2006/0150107 | A1 | 7/2006 | Leung et al. | |
| 2006/0195781 | A1 | 8/2006 | Jatavallabha et al. | |
| 2006/0294506 | A1 | 12/2006 | Dengler et al. | |
| 2007/0074121 | A1 | 3/2007 | Mullender et al. | |
| 2007/0130205 | A1 | 6/2007 | Dengler et al. | |

OTHER PUBLICATIONS

"Getting Started with Office Business Applications", Microsoft Press, 2007, pp. 8.

"Customizing Outlook Forms", downloaded Jan. 4, 2008 from http://www.add-in-express.com/docs/outlook-inspector-forms.php, Add-in Express LId, 3 Pages.

* cited by examiner

```
...
<CodeReference Namespace="OFS" Name="Account" Type="COM" Class="OFS.Account" />   }302
...
<Entity Namespace="acct" Name="AccountClass" IsPrimary="false">    ⎫
  <Properties>                                                    ⎪
    <Property Name="Application" Value="Office for Sales" />      ⎪
    <Property Name="Source" Value ="LOBi" />                      ⎬304
    <Property Name="Name" Value ="SAPAccountClass" />             ⎪
    <Property Name="Method" Value="FindAll" />                    ⎪
  </Properties>                                                   ⎪
</Entity>                                                         ⎭
...
<Section ShowLabel="true" ShowBar="true" ID="Section" Columns="3">        ⎫
  <Labels><Label LanguageCode="en">My Section</Label> </Labels>          ⎪
  <Rows>                                                                 ⎬306
    <Row Height="50px">                                                  ⎪
      <Cell Width="300px" Colspan="2" Rowspan="3" LeftPadding="5">       ⎭
        <Control ID="cbAcctClass" DataFieldname="AcctClass" ControlType="ComboBox">   ⎫
          <Properties>                                                                ⎪
            <Property Name="Caption" Value="Account Class:" />                        ⎪
     310 {  <Property Name="DropDownSourceEntity" Value="acct:AccountClass" />        ⎪
         {  <Property Name="DropDownSourceField" Value="ClassName" />                 ⎪
          </Properties>                                                               ⎬308
    312 { <Events>                                                                    ⎪
        {   <Event Name="OnChange">                                                   ⎪
        {     <CodeReferenceRef Name="OFS:Account" Method="AcctClassChange" />        ⎪
        {   </Event>                                                                  ⎪
        { </Events>                                                                   ⎪
        </Control>                                                                    ⎭
      </Cell>
...
```

*Figure 3A*

```
...
    <Cell Width="300px">
      <Control ID="dtCreateDate" DataFieldname="CreatedDate" ControlType="olkDatePicker">
        <Properties>
          <Property Name="Caption" Value="Date Created:" />
        </Properties>
      </Control>
    </Cell>
...
    </Row>
  </Rows>
</Section>
<Section ShowLabel="false" ShowBar="true" ID="nextSection" Columns="1">
...
```

IMPLEMENTING CUSTOM USER INTERFACE FORMS IN A PERSONAL INFORMATION MANAGER

BACKGROUND

Personal information manager (PIM) applications generally provide email, contacts, and calendar management to users of personal computers. However, as a part of an enterprise-wide office suite installation, the PIM may provide a centralized portal to business information and processes including communications, people, events, and business data. The PIM can aggregate and consolidate data across the enterprise from various business applications such as accounting, time management, sales, budgeting and forecasting, and executive management systems. In order to perform these functions and provide access to this data, the PIM must be customizable, allowing modification of the user interface of the PIM to expose the data from the various systems and adapt the PIM functionality to conform to the business processes of the enterprise.

While many PIM applications provide customization features, the customizations are often maintained through proprietary tools and user interfaces designed for the end-user of the PIM. This makes customizations by software developers difficult to implement and deploy throughout the organization. The proprietary nature of the PIM customizations may also prevent the data from being exposed in a consistent fashion across the applications of the enterprise-wide office suite. In addition, if a new version of the PIM application is deployed to end-users, any customizations made may be difficult to incorporate in the new PIM software.

It is with respect to these considerations and others that the disclosure made herein is presented.

SUMMARY

Technologies are described herein for incorporating custom user interface (UI) forms into a PIM application using a declarative form markup specification. Using the technologies provided, a specification for a custom UI form native to the PIM can be generated from a file containing the declarative form markup. The form markup file is stored along with the native form specification and utilized by a runtime engine that provides data binding to PIM-based and external data sources as well the incorporation of custom business logic during the rendering of the custom UI form. The use of a declarative form markup file to describe the custom UI form provides flexibility to developers in the design and deployment of customizations to PIM installations throughout the enterprise while promoting consistency of data presentation and reuse of form design across applications. By generating a native form specification from the declarative form markup file, the custom UI form retains the performance of native UI forms, and may take advantage of the functionality and advanced features of the PIM, such as localization.

According to aspects presented herein, a form markup file containing markup that describes the layout of controls on a custom UI form is utilized to generate a native UI form specification that may be immediately rendered by the PIM. The native UI form specification is stored in the form storage area of the PIM. In one aspect, the controls on the custom UI form consist of those native to the PIM application. When the PIM receives a request to display the custom UI form, the native form specification is retrieved from the PIM form storage along with the original form markup file and the form is rendered to the display utilizing the PIM native form renderer.

According to further aspects, a forms runtime engine is also loaded during the rendering of the custom UI form to process the additional specifications in the form markup file. According to one aspect, the additional specifications may include event subscriptions to custom business logic contained in a custom business logic module. According to another aspect, the additional specifications may include data binding information for the controls on the custom UI form to allow the controls to be bound to both internal PIM data and external data sources. The forms runtime engine performs the data binding and event subscriptions specified in the declarative form markup file before the PIM renders the custom UI form.

It should be appreciated that the above-described subject matter may be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 3A and 3B show a code listing illustrating samples of a declarative form markup language according to embodiments provided herein;

DETAILED DESCRIPTION

Figure 1:
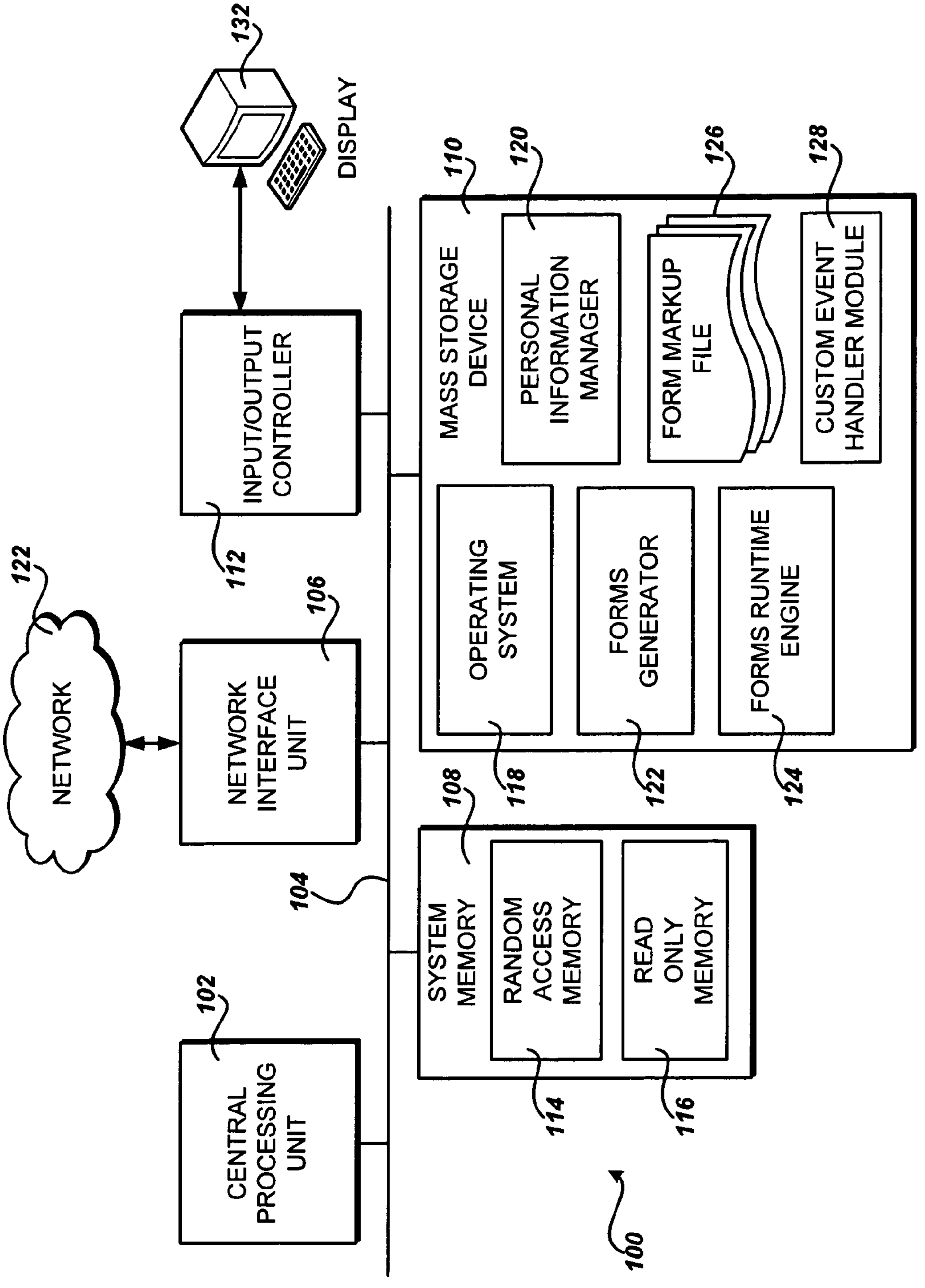
FIG. 1 is a block diagram showing an illustrative computer hardware and software architecture for a computing system capable of implementing aspects of the embodiments presented herein.

The following detailed description is directed to technologies for incorporating custom UI forms into a PIM application using a declarative form markup specification. While the subject matter described herein is presented in the general context of an application program that operates in conjunction with the execution of an operating system on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which show by way of illustration specific embodiments or examples. Referring now to the drawings, in which like numerals represent like elements through the several figures, aspects of a computing system and methodology for incorporating custom user interface forms in a personal information manager using a declarative form markup specification will be described.

Turning now to FIG. 1, details will be provided regarding an illustrative operating environment and several software components provided by the embodiments presented herein. In particular, FIG. 1 shows an illustrative computer architecture for a computer 100 capable of executing the software components described herein for incorporating custom user interface forms into a personal information manager using a declarative form markup specification. The computer architecture shown in FIG. 1 illustrates a conventional desktop, laptop, or server computer and may be utilized to execute any aspects of the software components presented herein.

The computer architecture shown in FIG. 1 includes a central processing unit 102 (CPU), a system memory 108, including a random access memory (RAM) 114 and a read-only memory (ROM) 116, and a system bus 104 that couples the memory to the CPU 102. A basic input/output system containing the basic routines that help to transfer information between elements within the computer 100, such as during startup, is stored in the ROM 116. The computer 100 further includes a mass storage device 110 for storing an operating system 118, application programs, and other program modules, which are described in greater detail herein.

The mass storage device 110 is connected to the CPU 102 through a mass storage controller (not shown) connected to the bus 104. The mass storage device 110 and its associated computer-readable media provide non-volatile storage for the computer 100. Although the description of computer-readable media contained herein refers to a mass storage device, such as a hard disk or CD-ROM drive, it should be appreciated by those skilled in the art that computer-readable media can be any available computer storage media that can be accessed by the computer 100.

By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer 100.

According to various embodiments, the computer 100 may operate in a networked environment using logical connections to remote computers through a network such as the network 122. The computer 100 may connect to the network 122 through a network interface unit 106 connected to the bus 104. It should be appreciated that the network interface unit 106 may also be utilized to connect to other types of networks and remote computer systems. The computer 100 may also include an input/output controller 112 for receiving and processing input from a number of other devices, including user input devices like a keyboard, mouse, or electronic stylus (not shown in FIG. 1). Similarly, an input/output controller may provide output to a display screen, a printer, or other type of output device (also not shown in FIG. 1).

As mentioned briefly above, a number of program modules and data files may be stored in the mass storage device 110 and RAM 114 of the computer 100, including an operating system 118 suitable for controlling the operation of a networked desktop, laptop, or server computer. The mass storage device 110 and RAM 114 may also store one or more program modules. In particular, the mass storage device 110 and the RAM 114 may store a PIM application 120, a forms generator 122, a forms runtime engine 124, and a custom event handler module 128, all of which provide the functionality presented herein for incorporating a custom UI form in the PIM from a declarative form markup specification, and are described in detail below in regard to FIG. 2. In addition, the mass storage device 110 and the RAM 114 may also store form markup files 126 that contain the declarative form markup specifications. The mass storage device 110 and the RAM 114 may also store other types of program modules or data.

It will be appreciated that, while the embodiments illustrated herein are described as executing as traditional client applications on the computer 100, they may also be implemented using a client-server model, such as Web-based applications executing on a server computer and accessible over the public Internet or through a private Intranet by a Web browser application executing on a client computer 100.

Figure 2:
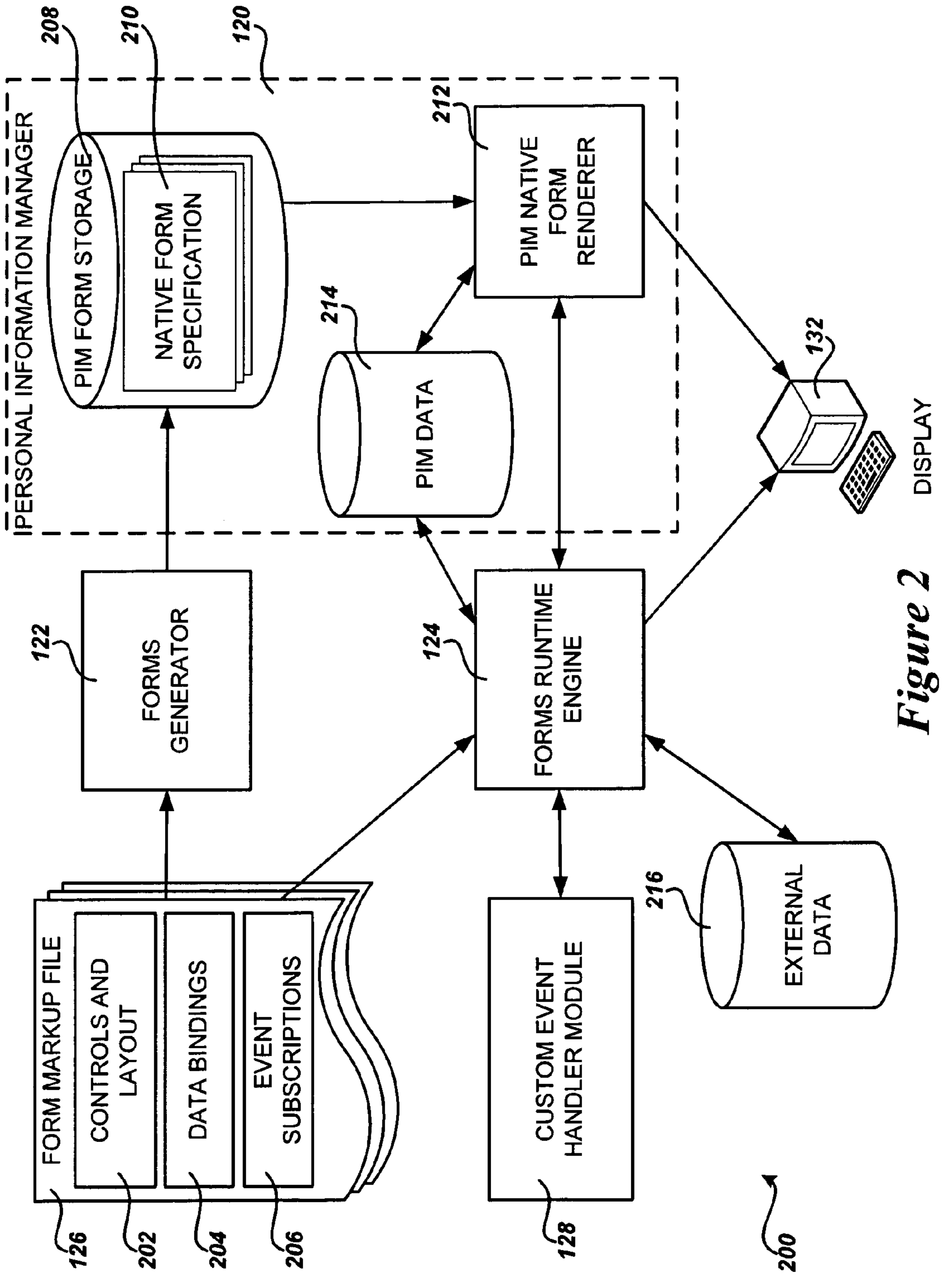
FIG. 2 is a block diagram showing further aspects of an illustrative operating environment and several software components provided by the embodiments presented herein.

FIG. 2 shows further aspects of an illustrative operating environment and several software components for incorporating custom UI forms into a PIM using a declarative form markup specification, according to embodiments. The environment 200 includes a PIM application 120, which provides functionality for accessing and consolidating email, events, contacts, and business information, as described in the Background provided above. According to one embodiment, the PIM 120 is the MICROSOFT® OFFICE OUTLOOK® messaging and collaboration client from MICROSOFT CORPORATION of Redmond, Wash. It should be appreciated, however, that the embodiments presented herein may be utilized with PIM application programs from other vendors, including but not limited to, IBM® LOTUS NOTES® software from IBM CORP. of Armonk, N.Y., NOVELL® GROUPWISE® software from NOVELL, INC. of Waltham, Mass., or MICROSOFT® ENTOURAGE® e-mail and personal information manager, also from MICROSOFT CORPORATION.

The PIM 120 provides the capability for its user interface to be customized to allow access to data from a variety of external and internal data sources as well as allow the layout and functionality of the interface to be modified to tailor the PIM 120 to custom business processes. According to embodiments described herein, customization of the PIM user interface is accomplished by creating custom UI forms. The design of a custom UI form includes the layout of UI controls on the form that are displayed to a user of the PIM 120 along with underlying logic to control the functionality and interaction of the controls with the user.

A custom UI form may be designed to display the entire user interface to the user at a given time, or it may be designed to be incorporated in a specific region of a larger native user interface of the PIM 120, as will be described in more detail in regard to FIG. 4. The UI controls may include controls common to most modern user interfaces, such as labels, text boxes, command buttons, option buttons, check boxes, list boxes, and combo boxes, as well as controls specific to the PIM 120. For example, the MICROSOFT® OFFICE OUTLOOK® messaging and collaboration client provides native support for a number of common UI controls as well as a date picker control and a time picker control that provide specific functionality associated with the selection of date and time data. It will be appreciated that the UI controls available in the PIM 120 for customization may include any number of common UI controls and PIM specific controls known in the art.

The PIM 120 may allow for the design and creation of custom UI forms utilizing a proprietary set of tools and utilities provided by the PIM 120. When a custom UI form is created in this manner, the design of the custom UI form is saved in a native form specification 210 that is stored in a form storage 208 area of the PIM 120. If a user accesses the custom UI form, the PIM 120 utilizes a native form renderer 212 to read the native form specification 210 from the PIM form storage 208 and render the custom UI form on the display 132 and to handle any programming logic associated with the custom UI form.

The environment 200 also includes a number of form markup files 126 that contain a declarative form markup specifying the design of custom UI forms to be utilized by the PIM 120. Each form markup file 126 contains markup that specifies the details of the UI controls 202 to be included in the custom UI form as well as the layout of the controls. As will be described in further detail below, the form markup file 126 may also contain markup that specifies data bindings 204 and event subscriptions 206 to custom event handlers for the UI controls, which are utilized in rendering the custom UI form. According to one embodiment, the declarative form markup of the form markup files 126 complies with the FormXML schema implemented by MICROSOFT CORPORATION in its MICROSOFT® DYNAMICS™ business software. It will be appreciated, however, that any declarative form markup language commonly known in the art could be utilized to describe the layout of UI controls on a custom UI form as described herein.

A standard set of form markup files 126 may be made available as a part of an extension to the PIM user interface for accessing data from an external enterprise application. For example, a set of form markup files 126 may exist that extend the PIM 120 to allow it to access data in an enterprise resource planning application, such as SAP® R/3® software from SAP AG of Walldorf, Germany. These form markup files 126 may be further modified for a particular organization to tailor the custom UI forms for the data and business processes of that organization. The custom UI forms may be modified by adding or removing UI controls, modifying the layout of controls on the form, adding custom business logic to event handlers for the controls, or binding the controls to data in external data sources. In addition, the organization may add a number of new custom UI forms.

Storing the design of the custom UI forms as declarative markup in the form markup files 126 instead of as native form specifications 210 in the PIM form storage 208 provides several advantages. First, it makes it easier for an organization to preserve their modifications to the form markup files 126 if new versions are rolled-out as part of an upgrade to the external enterprise application. Second, the same set of form markup files may be used to extend the PIM 120 user interface as well as other enterprise applications that support extension of their user interface using the same declarative markup. It will be appreciated by one of skill in the art that many more advantages exist in having the design of custom UI forms stored in files containing a declarative markup language.

A forms generator 122 is utilized to generate native form specifications 210 for the PIM 120 from the form markup files 126. The forms generator 122 reads the markup from the form markup file 126, and converts the information contained therein to the form required by the PIM 120 to describe the design of the custom UI form, as will be described in detail below in regard to FIG. 5. The forms generator 122 stores the native form specifications 210 generated from the form markup files 126 in the PIM form storage 208.

In one embodiment, the forms generator 122 may be utilized at design time to generate native form specifications 210 for a set of custom UI forms. The native form specifications 210 will then be stored in a central PIM form storage 208 or distributed to individual PIM 120 installations in order to make the custom UI forms available to the required users. In another embodiment, the form markup files 126 containing the declarative markup may be distributed to the individual PIM 120 installations and the forms generator 122 executed upon first use of a custom UI form to generate the native form specification 210 for the form and store it in the local PIM form storage 208 for subsequent use.

Once the native form specification 210 is generated from the form markup file 126 and stored in the PIM form storage 208, it can be rendered by the PIM native form renderer 212 when requested for display. This allows the custom UI form described by the form markup file 126 to take advantage of advanced features of the PIM user interface, such as localization. In one embodiment, the declarative markup of the form markup file 126 includes only UI controls that can be natively rendered by the PIM native form renderer 212. In another embodiment, the form markup file 126 may contain both PIM native controls and UI controls not natively supported by the PIM 120.

According to embodiments, the form markup file 126 may contain data bindings 204 that specify internal and external data sources to be bound to UI controls or events subscriptions 206 specifying events generated by the UI controls that should be handled by custom business logic. When rendering a custom UI form generated from a form markup file 126, the PIM native form renderer 212 invokes a forms runtime engine 124 to process the data bindings 204 and event subscriptions 206. The forms runtime engine 124 executes on the computer 100 along with the PIM 120, and loads the form markup file 126 from which the native form specification 210 was generated in order to process the data bindings 204 and event subscriptions 206 specified in the form markup. In one embodiment, the form markup file 126 used to generate the native form specification 210 is distributed to each computer on which the PIM 120 and the forms runtime engine 124 execute. In another embodiment, the markup from the form markup file 126 is stored in the PIM form storage 208 along with the native form specification 210 for the custom UI form. In a further embodiment, the forms runtime engine 124 also renders any UI controls on the custom UI form that are not native to the PIM 120.

Data bindings 204 included in the form markup file 126 specify a source of data from which the contents of a UI control will be populated. For example, a combo box control includes a dropdown selection box from which a user interacting with the control may select a value. The markup defining the combo box control in the form markup file 126 may specify that the dropdown selection box is to be populated with values from a specific data source when the control is displayed to the user. The forms runtime engine 124 may bind data from both internal PIM data 214 and external data 216 to the UI controls on the form, as will be described in greater detail below in regard to FIG. 6.

Event subscriptions 206 included in the form markup file 126 specify custom business logic that is to be executed when a particular event is generated by the custom UI form or a control on the form. For example, the markup defining the combo box control described in the example above may further specify that a particular sequence of business logic should be executed when an "OnChange" event is generated by the combo box control, in other words, when the value of the combo box is changed by the user. In one embodiment, the custom business logic specified by the event subscriptions 206 in the form markup file 126 is contained in a custom event handler module 128 that also executes on the runtime computer with the forms runtime engine 124 and the PIM 120.

The custom event handler module 128 contains functions or methods that are invoked by the forms runtime engine 124 upon the generation of an event by the UI control specified in an event subscription 206, as will be described in greater detail below in regard to FIG. 6. In a further embodiment, the custom event handler module 128 is an object module that is compliant with the component object model (COM) from MICROSOFT CORP. It will be appreciated, however, that the custom business logic for an event subscription 206 may be packaged in any method commonly known in the art that would make the business logic available to the forms runtime engine 124 and the PIM 120 during the rendering of the custom UI form.

FIG. 3 is a code listing showing an example of declarative markup in a form markup file 126, according to embodiments described herein. Specifically, FIG. 3 illustrates portions of a form markup file 126 containing FormXML markup specifying the design of a custom UI form that is to be used to extend the user interface in the MICROSOFT® OFFICE OUTLOOK® messaging and collaboration client, according to one embodiment. The markup includes a CodeReference element 302, which specifies a custom event handler module containing custom business logic to be tied to an event of a UI control by an event subscription 206 later in the code listing. The CodeReference element 302 specifies a namespace of "OFS" and a name of "Account" that are used to further reference the custom event handler module internally in the form markup file 126. The CodeReference element 302 in this example also specifies that the custom event handler module is a COM object module registered with the class name "OFS.Account."

The FormXML markup also includes an Entity element 304, which specifies a data source to be bound to UI controls later in the code listing. Like the CodeReference element described above, the Entity element 304 specifies a namespace of "acct" and a name "AccountClass" which is used to reference the data source internally in the form markup file 126. The Entity element 304 further specifies that the data for the data source is to be accessed through the LOBI FOR MICROSOFT OFFICE SHAREPOINT® SERVER software from MICROSOFT CORPORATION, specifically from a class named "SAPAccountClass" using the method "FindAll" of that class. The forms runtime engine 124 will utilize this information to connect to the data source and retrieve the data for populating any bound controls, as will be described in more detail in regard to FIG. 6.

As further illustrated in FIG. 3, the FormXML markup includes elements 306 that dictate the layout of the custom UI form, such as a Section element which delineates sections of the form with an optional line and a label of "My Section", and Row and Cell elements which drive a table-like structure for the placement of UI controls on the form. The declarative form markup also contains a Control element 308 that specifies a combo box control that is to be placed on the custom UI form. The combo box control is given a caption of "Account Class" and is tied to a data field of the object or entity being displayed in the custom UI form named "AcctClass." The markup for the combo box control also specifies a data binding 310, 204 for the population of the dropdown portion of the combo box. The data binding 310, 204 references the data source "acct:AccountClass" defined by the Entity element 304 described above. Specifically, the dropdown portion of the combo box will be filled with values from the "ClassName" field of the data source.

The markup for the Control element 308 describing the combo box control includes an event subscription 312, 206 that specifies a custom event handler that should be executed when an "OnChange" event is generated by the combo box control. The event subscription 312, 206 specifies the "AcctClassChange" method of the custom event handler module described by the CodeReference element 302 "OFS:Account" described above. The forms runtime engine 124 will utilize this information to execute the "AcctClassChange" method of the referenced "OFS.Account" COM object when the OnChange event of the combo box control occurs, as will be described in more detail below in regard to FIG. 6.

The FormXML markup in this example also contains a Control element 314 that describes a PIM specific date picker control that is to be placed on the custom UI form. The data picker control is displayed with a caption of "Date Created" and is tied to the data field "CreatedDate" of the currently displayed object or entity, as further specified in the markup for the Control element 314.

Figure 4:
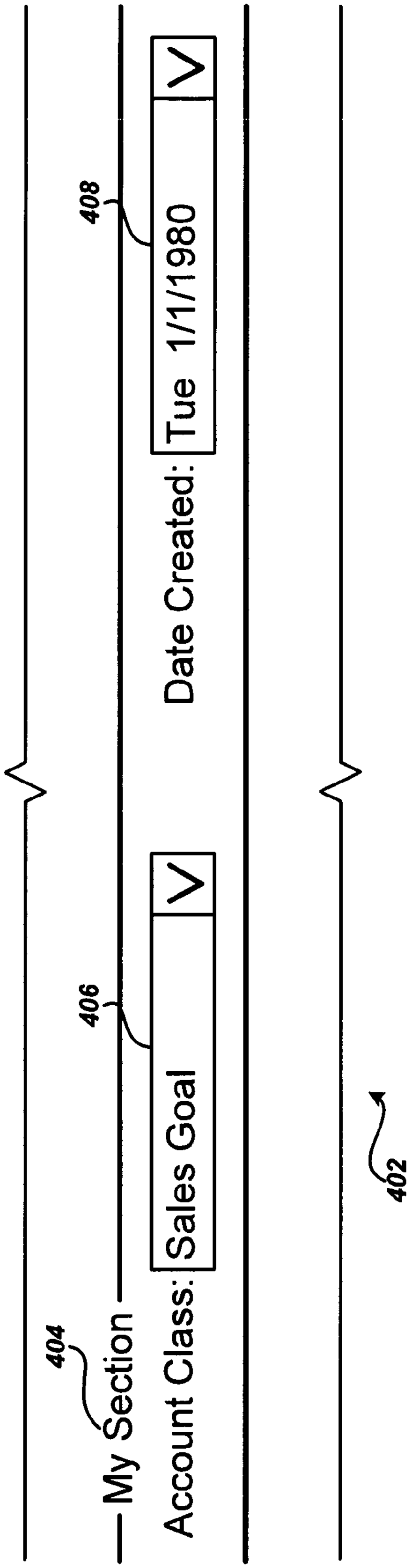
FIG. 4 is a screen diagram showing an illustrative custom user interface form generated by the form markup language sample provided herein, according to embodiments.

FIG. 4 is a screen diagram showing a section of the custom UI form 402 described by the FormXML markup illustrated in FIG. 3. As described above, the custom UI form 402 includes a section header 404 labeled "My Section" and set apart from the remainder of the user interface by a line. The custom UI form 402 also includes the "Account Class" combo box UI control 406 and the "Date Created" date picker UI control 408 as specified by the FormXML in the form markup file 126 provided in the example above. As described above, the custom UI form 402 illustrated in FIG. 4 may represent the entire contents of a user interface displayed to the user or may be included in a region of a larger user interface displayed by the PIM 120 to the user.

Figure 5:
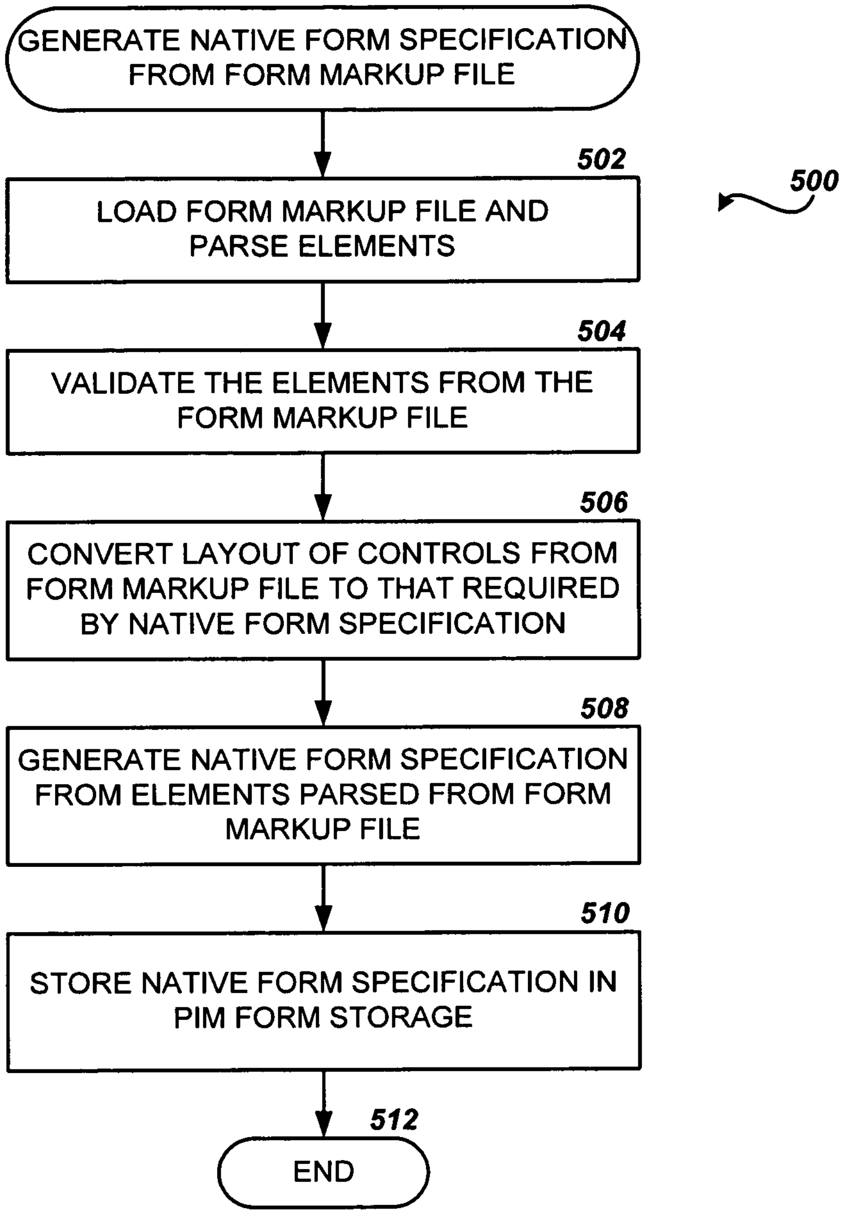
FIG. 5 is a flow diagram showing one method for generating a native PIM form specification from a form markup file, as provided in the embodiments described herein.
Figure 6:
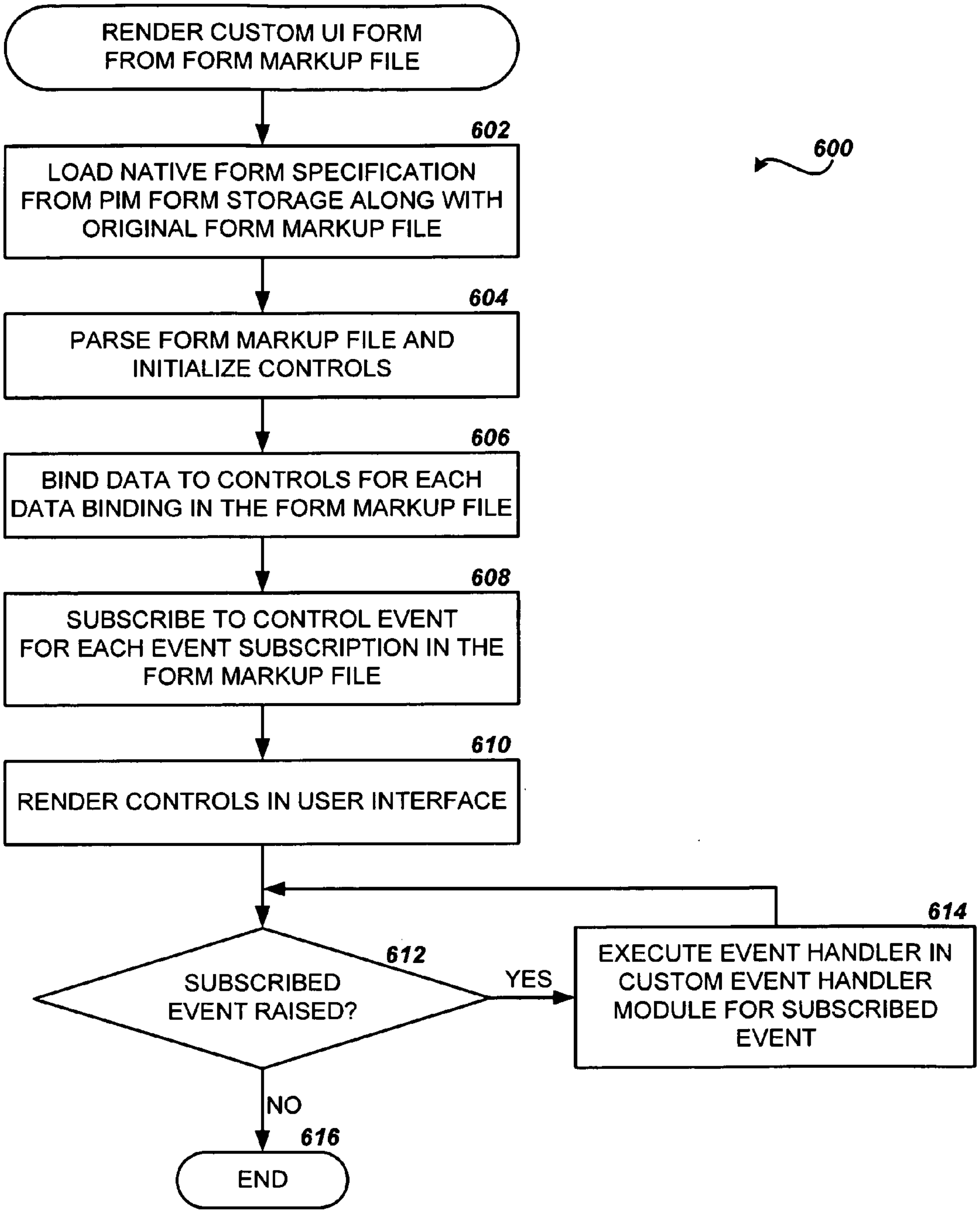
FIG. 6 is a flow diagram showing one method for rendering a custom UI form generated from a form markup file, as provided in the embodiments described herein.

Referring now to FIGS. 5 and 6, additional details will be provided regarding the embodiments presented herein. In particular, FIG. 5 is a flow diagram showing a method for generating the native form specification 210 from a form markup file 126, according to one embodiment. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in a different order than those described herein.

The routine 500 begins at operation 502, where the forms generator 122 loads the form markup file 126 and parses the elements from the declarative form markup contained therein. As described above, the forms generator 122 uses the FormXML schema to parse the markup, according to one embodiment. The routine 500 then proceeds to operation 504, where the forms generator 122 validates that the markup of the form markup file 126 complies with the FormXML schema, and that the elements contained in the markup can be rendered by the PIM native form renderer 212. In order to provide flexibility for the customization of the user interfaces across various enterprise office applications, the FormXML schema may support a broader range of UI controls and other elements than can be rendered by the PIM native form renderer 212. In one embodiment, the forms generator 122 ignores the control elements that cannot be rendered during the generation of the native form specification 210 and generates a warning. Similarly, properties or attributes of UI controls and other elements not supported by the PIM 120 will be ignored during the generation of the native form specification 210 for the PIM 120.

From operation 504, the routine 500 proceeds to operation 506, where the forms generator 122 converts the elements parsed from the form markup file 126 to the form or structure required by the native form specification 210 to be generated. For example, the FormXML schema specifies that UI controls are laid out on the custom UI form in horizontal rows and vertical columns, similar to a hypertext markup language (HTML) table. The native form specification of the PIM, however, may use absolute positioning for UI controls, requiring an X and Y pixel location be specified for each control. The forms generator 122 will convert the row and column location of the UI controls specified in the FormXML markup to the absolute positions required by the PIM before generating the native form specification 210, according to one embodiment. It will be appreciated by one of ordinary skill in the art that many other aspects of the UI controls or other elements defined by the markup in the form markup file 126 may have to be similarly converted by the forms generator 122, depending on the requirements of the PIM 120 for which the native form specification 210 is being generated.

The routine 500 continues from operation 506 to operation 508, where the forms generator 122 generates the native form specification 210 from the converted elements parsed from the form markup file 126. The output from this step similarly depends on the specific PIM 120 for which the native form specification 210 is being generated. For example, the design of custom UI forms in the MICROSOFT® OFFICE OUTLOOK® messaging and collaboration client is contained in a binary OUTLOOK® form storage (OFS) file and a forms region manifest XML file. In one embodiment, the forms generator 122 uses an application programming interface (API) exposed by the PIM to generate the binary OFS file while the manifest XML file is generated directly by the forms generator 122. In another embodiment, the files of the native form specification 210 may be directly generated by the forms generator 122, depending on the requirements of the target PIM 120.

In addition, the form markup file 126 may contain references to resource files that contain localized strings for control captions and other displayed text items. According to one embodiment, the forms generator 122 also converts the referenced resource files to native PIM localization files as part of the native form specification 210 generation to support localization in the PIM. In a further embodiment, the forms generator 122 includes in the generated native form specification 210 the information required to ensure the forms runtime engine 124 is invoked when the custom UI form is rendered by the PIM 120.

From operation 508, the routine 500 proceeds to operation 510, where the forms generator 122 stores the native form specification 210 in the PIM form storage 208. For example, the OFS and manifest XML files described above generated for a custom UI form may be distributed to each computer where the PIM is installed or may be made available through a shared location that is accessible to all PIM clients requiring the custom UI form. In addition, the form markup file 126 utilized to generate the native form specification 210 is made available to the PIM clients. The markup from the form markup file 126 is utilized by the forms runtime engine 124 during the rendering of the custom UI form, as will be described in more detail below. The routine 500 then proceeds to operation 512 where the routine 500 ends.

FIG. 6 is a flow diagram showing one method for rendering a custom UI form originally described in a form markup file 126, according to embodiments described herein. The routine 600 begins at operation 602, where the PIM 120 loads the native form specification 210 from the PIM form storage 208 in order to render the form. In one embodiment, the native form specification 210 is initially loaded by the PIM native form renderer 212 and the UI controls specified on the form are initialized. Upon recognizing that the native form specification 210 was originally generated from the form markup file 126, the PIM native form renderer 212 invokes the forms runtime engine 124, which then loads the form markup file 126 to assist in rendering the custom UI form.

From operation 602, the routine 600 proceeds to operation 604, where the forms runtime engine 124 parses the markup of the form markup file 126 to retrieve the data bindings 204 and event subscriptions 206 for further processing before the custom UI form is rendered by the PIM native form renderer 212. In one embodiment, the form markup file 126 may contain UI controls not native to the PIM 120 that the PIM native form renderer 212 cannot render. As described above, the forms runtime engine 124 also performs the instantiation and initialization of these non-native UI controls.

The routine 600 then proceeds from operation 604 to operation 606, where the forms runtime engine 124 processes the data bindings 204 parsed from the form markup file 126. Specifically, the forms runtime engine 124 binds data to the UI controls in the form markup file 126 based on the data source specified in the markup. Data may be bound from both internal PIM data 214 and external data 216 sources. In addition, data may be bound from multiple data sources for a single UI control. According to one embodiment, for data bindings 204 specifying a data source referencing internal PIM data 214, the forms runtime engine 124 binds the data to the UI control specified in the markup and the data binding functions are handled by the UI control. For data bindings 204 specifying a data source referencing external data 216, the forms runtime engine 124 manages all of the data binding functions, including initial population of data in the control from the external data source. In a further embodiment, the forms runtime engine 124 also manages adding or updating external data when the custom UI form is saved.

It will be appreciated by those skilled in the art that, because processing of the data bindings 204 by the forms runtime engine 124 may require several seconds, some or all of this processing may be deferred until after the custom UI form has been fully rendered. In this way, a user may begin to interact with the custom UI form before the data binding process is complete.

From operation 606, the routine 600 proceeds to operation 608, where the forms runtime engine 124 subscribes to the events for the UI controls specified by the event subscriptions 206 parsed from the form markup file 126. Only the events specified by the events subscriptions 206 are subscribed to in order to maintain performance of the custom UI form when displayed by the PIM 120, according to one embodiment. In a further embodiment, the event subscriptions 206 are configured to invoke the forms runtime engine 124 when a corresponding event is generated by the custom UI form or control. The forms runtime engine 124 then dispatches the event to the custom event handler specified in the associated event subscription 206, as will be described in detail below.

Next, the routine 600 proceeds from operation 608 to operation 610, where the PIM native form renderer 212 renders the custom UI form to the display 132 according to the native form specification 210 generated from the form markup file 126 and the initializations, data bindings, and event subscriptions performed by the forms runtime engine 124. In one embodiment, the forms runtime engine 124 also has the capability to render a number of UI controls beyond those natively rendered by the PIM 120, as described above.

From operation 610, the routine 600 proceeds to operation 612, where the forms runtime engine 124 monitors for the subscribed events. If a subscribed event is detected, the routine 600 proceeds to operation 614, where the forms runtime engine 124 dispatches the event to the custom event handler specified in the associated event subscription 206. As described briefly above, the custom event handlers may be contained in methods or functions exposed by the custom event handler module 128, according to one embodiment. It will be appreciated, however, that the forms runtime engine 124 may execute any method or function exposed on the computer upon which the forms runtime engine 124 and the PIM 120 are located, including methods exposed by the PIM 120. In a further embodiment, the methods or functions specified in the event subscriptions 206 have a standard calling interface, based upon the PIM 120 for which the custom UI form is generated. If no further subscribed events are generated and the custom UI form is closed, then the routine 600 proceeds from operation 612 to operation 616 where the routine 600 ends.

Based on the foregoing, it should be appreciated that technologies for incorporating custom user interface forms into a personal information manager using a declarative form markup specification are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for implementing a custom user interface (UI) form in a personal information manager (PIM), the method comprising:

loading a form markup file containing markup that specifies a layout of one or more UI controls on the custom UI form, data binding information specifying internal and external data sources from which contents of the one or more UI controls will be populated, and event subscription information specifying logic to be executed by a custom event handler when a particular event is generated by the one or more UI controls;

generating a native UI form specification for the PIM from the form markup file;

storing the native UI form specification in a PIM form storage;

receiving a request at the PIM to display the custom UI form;

upon receiving the request, retrieving the native UI form specification from the PIM form storage;

rendering the one or more UI controls on the custom UI form by a forms runtime engine external to the PIM; and displaying the custom UI form by incorporating the custom UI form in a specific region of a native UI displayed by the PIM.

2. The method of claim 1, wherein retrieving the native UI form specification from the PIM form storage further comprises retrieving the form markup file from which the native UI form specification was generated.

3. The method of claim 2, further comprising:

for each of the two or more UI controls having an event subscription to a custom event handler, subscribing to the event specified in the event subscription for the UI control.

4. The method of claim 3, wherein the custom event handler is contained in a custom event handler module specified in the markup.

5. The method of claim 4, further comprising:

detecting an event generated by the two or more UI controls having an event subscription to a custom event handler specified in the markup; and upon detecting the event, dispatching the event to the custom event handler in the custom event handler module.

6. The method of claim 1, wherein the data source comprises one of a PIM data source and an external data source.

7. A system for rendering a custom user interface (UI) form in a personal information manager (PIM), the system comprising:

a design computer comprising at least one processor that executes instructions in a memory in communication with the at least one processor, the design computer further comprising:

a forms generator module configured to execute on the design computer and to generate a native UI form specification for a PIM, the native UI form specification containing one or more UI controls from a form markup file containing markup that specifies the design of a custom UI form by providing a layout of the one or more UI controls, data binding information specifying internal and external data sources from which contents of the one or more UI controls will be populated, and event subscription information specifying logic to be executed by a custom event handler when a particular event is generated by the one or more UI controls; and a runtime computer comprising at least one processor that executes instructions in a memory in communication with the at least one processor, the runtime computer further comprising:

a PIM application configured to execute on the runtime computer, to store the native UI form specification in a PIM form storage, and to render the native UI form specification to display the custom UI form by incorporating the custom UI form in a specific region of a native UI displayed by the PIM; and a forms runtime engine module configured to execute on the runtime computer, to bind a data source to each of the one or more UI controls on the custom UI form having the data binding information specified in the form markup file, and to subscribe to an event for each of the one or more UI controls on the custom UI form having the event subscription information to a custom event handler for the event generated by the UI control specified in the form markup file.

8. The system of claim 7, wherein each of the one or more UI controls is of a type that is natively supported by the PIM.

9. The system of claim 7, wherein the data source comprises one of a PIM data source or an external data source.

10. The system of claim 7, wherein the custom event handler is contained in a custom event handler module specified in the form markup file.

11. The system of claim 10, wherein the forms runtime engine module is further operative to:

detect an event generated by one of the one or more UI controls having an event subscription to a custom event handler specified in the form markup file; and upon detecting the event, dispatching the event to the custom event handler in the custom event handler module.

12. The system of claim 7, wherein the markup of the form markup file is compliant with the FormXML specification.

13. A system comprising:

a computer comprising at least one processor that executes computer executable instructions stored in a memory in communication with the at least one processor that, when executed by the computer, cause the computer to:

load a form markup file that specifies a design of a custom UI form containing markup that specifies a layout of one or more user interface (UI) controls, data binding information specifying internal and external data sources from which contents of the one or more UI controls will be populated, and event subscription information specifying logic to be executed by a custom event handler when a particular event is generated by the one or more UI controls;

generate a native UI form specification for a personal information manager (PIM) from the markup of the form markup file;

store the native UI form specification in a PIM form storage;

receive a request to display the custom UI form;

upon receiving the request, retrieve the native UI form specification from the PIM form storage;

for each of the one or more UI controls having data binding information specified in the form markup file, bind a data source specified in the data binding information to the UI control;

for each of the one or more UI controls having an event subscription specified in the form markup file, subscribe to an event specified in the event subscription to a custom event handler for the UI control; and render the custom UI form from the native UI form specification and display the custom UI form by incorporating the custom UI form in a specific region of a native UI displayed by the PIM.

14. The system of claim 13, wherein each of the one or more UI controls is of a type that is natively supported by the PIM.

15. The system of claim 13, wherein the data source comprises one of a PIM data source and an external data source.

16. The system of claim 13, wherein the custom event handler is contained in a custom event handler module specified in the markup.

* * * * *